E. Secor.
Fruit Crate,
Nº 60,796. Patented Jan. 1, 1867.
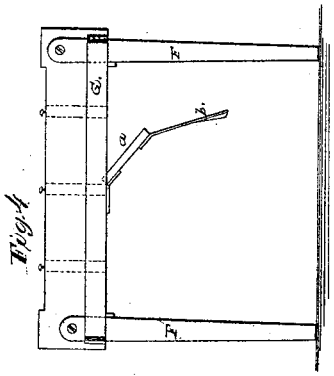
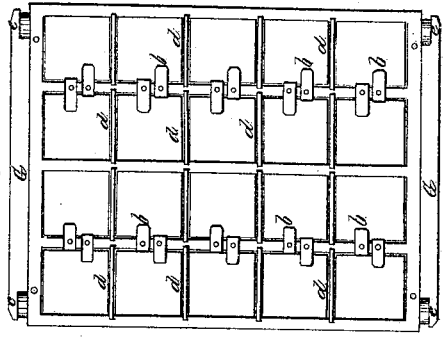
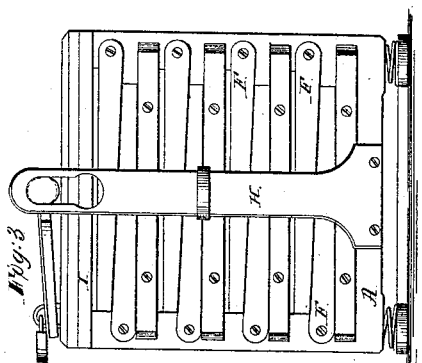
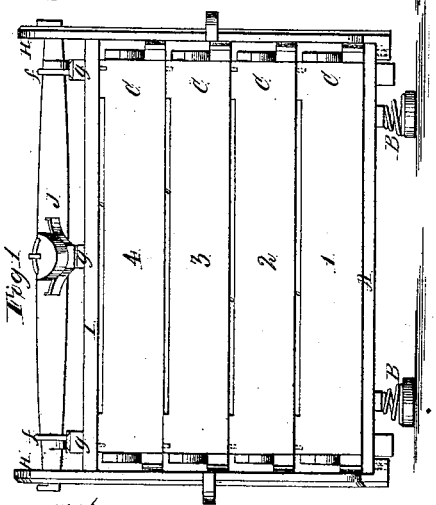
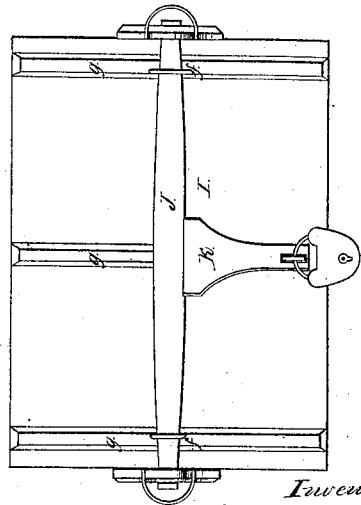
Witnesses: Inventor.

United States Patent Office.

ELI SECOR, OF LAWRENCE, MICHIGAN.

Letters Patent No. 60,796, dated January 1, 1867.

---

IMPROVEMENT IN BOXES FOR TRANSPORTING SMALL FRUIT AND BERRIES.

---

*The Schedule referred to in these Letters Patent and making part of the same.*

---

TO ALL WHOM IT MAY CONCERN:

Be it known that I, ELI SECOR, of Lawrence, in the county of Van Buren, and State of Michigan, have invented a new and improved Fruit-Box; and I do hereby declare that the following is a full, clear, and exact description thereof, which will enable others skilled in the art to make and use the same, reference being had to the accompanying drawings, forming part of this specification.

My invention consists in forming a box for transportation and safe-keeping of small varieties of fruit, as berries, &c., by combining a number of trays together in such a manner that they are easily separated, and in which the fruit may be safely kept and transported from place to place.

Figure 1 represents a front elevation of my fruit-box complete when ready for transportation.

Figure 2 is a top view of the same.

Figure 3 is an end view.

Figure 4 represents one of the trays detached; and

Figure 5 represents the interior of one of the trays.

Similar letters of reference indicate like parts.

A represents a platform which supports the trays, resting on springs to prevent jolting and injuring the fruit. These springs may be attached to the bottom in any convenient manner. B represents the springs, and in this example of my invention they stand between slats, the upper of which slat is attached to the bottom of the box. C represents the trays; these trays are shallow boxes which are divided off into compartments, as represented in fig. 5. Each compartment has a separate bottom, which is hung on hinges which allow it to drop down, as represented in fig. 4, at *a*; the bottom is fastened up by a strap, *b*, figs. 4 and 5. There are little wire studs or pins on the top of the tray over which the strap is locked, as seen in fig. 5. These compartments may be of any desired size, and the sliding partitions, *d*, are so arranged that two or more compartments may be thrown into one by removing the partition. In retailing the contents of the trays, the bottom is dropped down by unhooking the strap on the top of the tray, when the contents of the compartment are discharged into the vessel placed underneath to receive them. F represents the legs, four of which are attached to each tray, two at each end; when the trays are combined, as in figs. 1 and 3, the legs are folded up as seen in the end view, fig. 3. G represents pieces attached to the ends of each tray, with their ends cut away as seen at *e*, leaving a recess for the leg and supporting it. When it is turned over, as seen in fig. 4, the leg is attached to the tray by a pivot or joint, as seen in the drawing. H represents two binders, one at each end of the box, standing upright. They are attached to the bottom of the box by a hook on the lower end, the upper ends having slot-holes, as seen in fig. 2; these binders are used to bind the trays together as seen in figs. 1 and 3. I represents a cover or top to the box; it has three cleats, *g*, across its upper side, as seen in figs. 1 and 2. J is an eccentric roller, with a head at each end which passes through the lower and larger portion of the slot-holes in the binders H. The necks of the roll slip to the upper part of the slot, and the heads keep the binders from slipping off or becoming displaced. The roll is attached to the cover I, by staples, *f*, and just outside of the staples the roll is enlarged, forming shoulders and also eccentrics; when the box is fastened up these eccentrics bear upon the two outside cleats, binding down the trays and holding them in place. K is an arm attached to the middle of the roll, by which the roll is held down when the box is fastened. There is a staple in the middle cleat and a mortise through the end of the arm K, which acts as a hasp, shutting over the staple and allowing a padlock to pass through, as seen in fig. 2. There are dowel-pins and holes in the trays, that fit together, and which keep them from becoming displaced. The trays are made so that they do not lie close together when they are bound or combined, but a space is left between them for the circulation of air, as seen at *o* in the drawings. The lower ends of the binders H are detached from the bottom of the box by a blow on the upper end.

Having thus described my invention, what I claim as new, and desire to secure by Letters Patent, is—

1. A fruit-box for the transportation and safe-keeping of fruits or berries, constructed and arranged substantially as herein shown and described.

2. I claim the tray C, either separately or in combination, constructed and arranged substantially as herein shown and described, and for the purposes specified.

ELI SECOR.

Witnesses:
 JOHN SCOTFORD,
 J. HARVEY SCOTFORD.